H. S. McCORMACK.
TYPE WRITING MACHINE.
APPLICATION FILED DEC. 27, 1907.

921,619.

Patented May 11, 1909.
3 SHEETS—SHEET 1.

WITNESSES
C. E. Whitney
John A. Seifert

INVENTOR
H. S. McCormack
BY O. C. Stickney
ATTORNEY

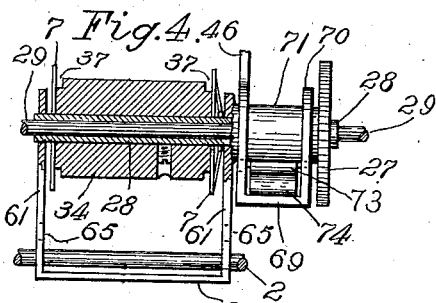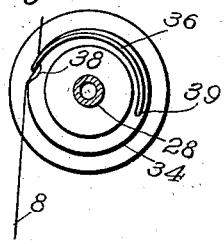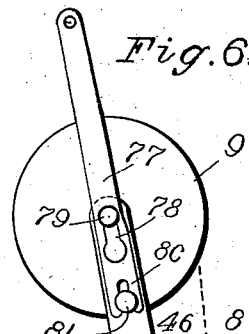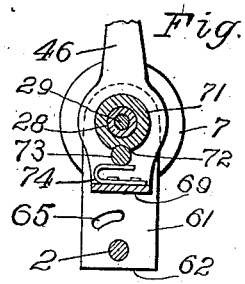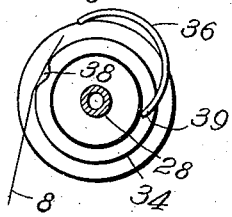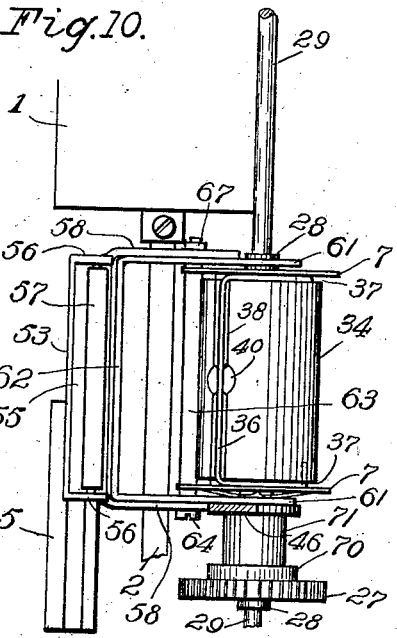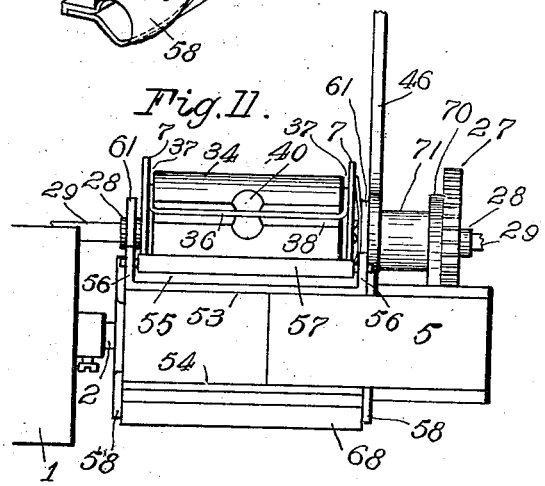

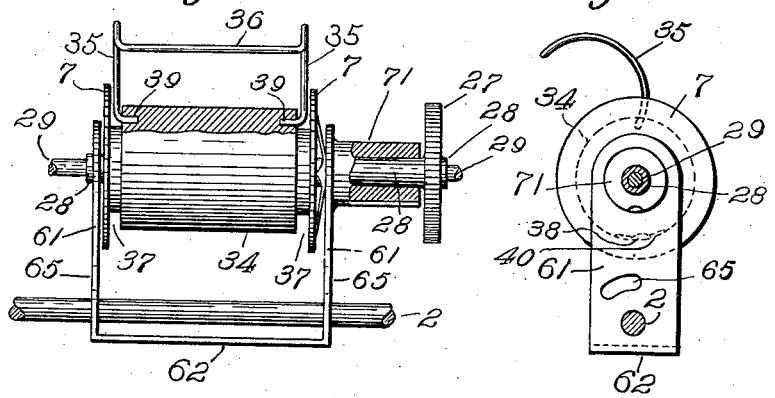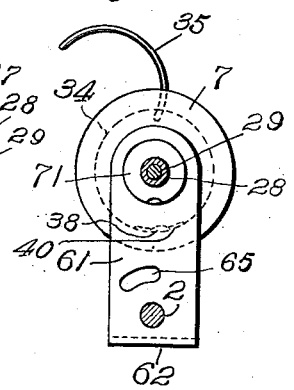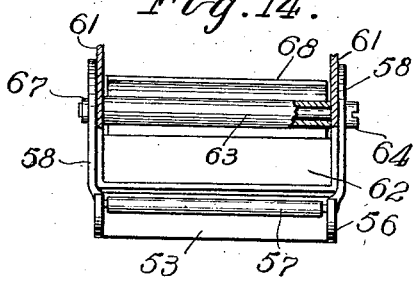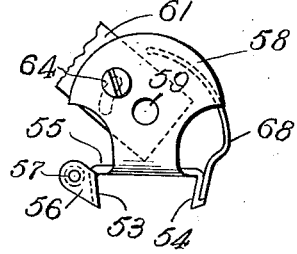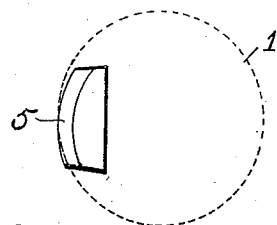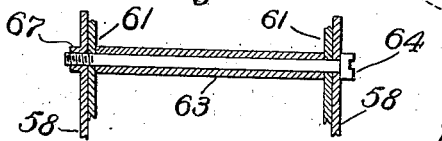

ED STATES PATENT OFFICE.

HARRY S. McCORMACK, OF NEW YORK, N. Y., ASSIGNOR TO UNDERWOOD TYPEWRITER COMPANY, OF NEW YORK, N. Y., A CORPORATION OF NEW JERSEY.

TYPE-WRITING MACHINE.

No. 921,619.

Specification of Letters Patent.

Patented May 11, 1909.

Application filed December 27, 1907. Serial No. 408,285.

*To all whom it may concern:*

Be it known that I, HARRY S. McCORMACK, a citizen of the United States, residing in New York, in the county of New York and State of New York, have invented certain new and useful Improvements in Type-Writing Machines, of which the following is a specification.

This invention relates to the tally strip mechanism of typewriting and other machines, especially those in which an auxiliary platen is arranged at the end of a main revoluble platen, and the tally strip is wound upon spools arranged above the auxiliary platen.

One of the objects of the invention is to improve the manner of constructing, mounting and adjusting the segmental auxiliary platen.

Another object is to provide improved means for winding the tally strip and preventing accidental backward movement thereof.

Another object is to provide improved means for holding the end of the tally strip on the winding spool.

A further object is to provide means for detaching the spool which carries the usual carbon strip together with its holder; and to provide improved means for detachably holding the spools.

Figures 1, 2:
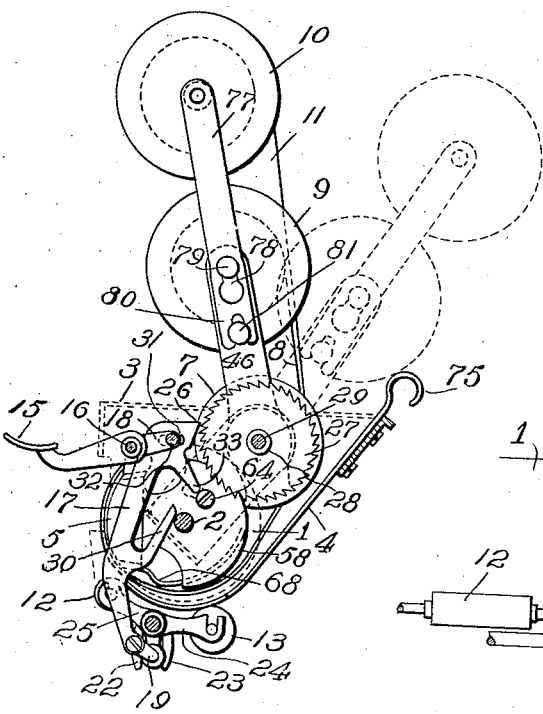
Figure 18:
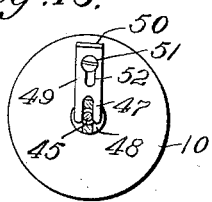
Figure 19:
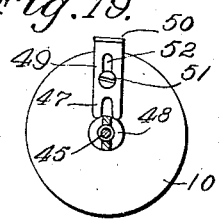
Figures 3, 20:
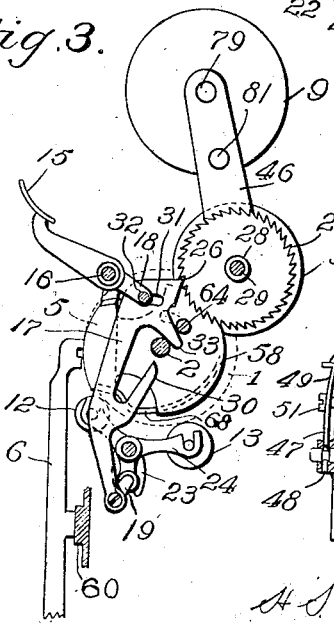

The means by which these objects are attained are illustrated in the accompanying drawings, in which:

Figure 1 is a sectional elevation of one end of the platen frame of an "Underwood" typewriting machine with my improvements applied thereto. The release key is shown depressed to release the rolls from the main platen and effect the line feeding of the tally strip. Fig. 2 is a front elevation of the same. Fig. 3 is a view showing parts as seen at Fig. 1, but showing the release key in normal position. Fig. 4 is a front elevation showing the lower end of an arm which carries the delivery spool, and a yielding detent therefor. Fig. 5 is a sectional view of the winding spool showing the leading end of the tally strip caught thereon. Fig. 6 is a sectional elevation of the tally strip spools and platen. Fig. 7 is a cross-section of the parts seen at Fig. 4. Fig. 8 is a view similar to Fig. 5, but showing the end of the tally strip released from the spool. Fig. 9 is a perspective view of a holding frame for the segmental platen. Fig. 10 is a plan and Fig. 11 is a front elevation of the segmental platen, the tally strip winding spool and appurtenances; the segmental platen being illustrated as partly drawn out from its frame in Figs. 9, 10 and 11. Fig. 12 is a front elevation, and Fig. 13 a side elevation, showing the winding spool and a frame which forms part of the device for adjusting the auxiliary platen. Fig. 14 is a plan, and Fig. 15 a side view of the frame which holds the auxiliary platen. Fig. 16 is a front view, and Fig. 17 an end view of the auxiliary platen. Figs. 18 and 19 are sectional views, showing the end of the ribbon spool and means for detachably securing it upon a stud; Fig. 18 showing the spool as secured, and Fig. 19 showing it released from the stud. Fig. 20 is a sectional view showing details seen at Figs. 18 and 19. Fig. 21 is a sectional view showing the manner of adjustably securing the auxiliary platen carrier.

The usual cylindrical platen 1 is provided with an axle 2, whereby it is revolubly mounted in the ends 3 of a platen frame 4. Between the ends of the main platen 1 and the end 3 of the platen frame is confined a segmental platen 5 whose front face is curved and approximately coincides with the cylindrical surface of the platen 1; type bars 6 striking on the front of both platens. Over the auxiliary platen, I mount a winding spool 7 for the tally strip 8, a delivery spool 9 for the same, and preferably a delivery spool 10 for a carbon strip 11. Upon the under side of the platen 1 run front and rear pressure rolls 12, 13, operated by springs 14, and released by means of a finger key 15 pivoted at 16 upon the end 3 of the platen frame. A link 17 extends from an arm 18 of the key to a crank 19 provided upon the end of a rock shaft 20, the latter having flats or cams 21 to engage arms 22, 23 to release the rolls 12, 13 in a well known manner, said arms 22, 23 being formed integral with roll carrying arms 24, 25, as usual. Depression and elevation of the key 15 alternately releases and restores the pressure rolls. Upon the upper end of the link 17 is formed a dog 26 normally engaging a ratchet wheel 27, which is connected to the strip winding spool 7 by means of a hollow shaft 28 revoluble upon a rod 29 usually extending along the platen 1 from end to end of the platen frame, and fixed thereto. When the key 15 is depressed, the dog 26 lifts the ratchet wheel 27 with which it is normally in engagement, thereby turning the spool 7 and drawing the strip 8 around the segmental platen 5. During the return stroke of the key, the dog rides down without turning the ratchet wheel, so that the strip is fed line by line every time that the pressure rolls 12, 13 are cast off to permit the withdrawal of a written bill and the insertion of a fresh sheet around the main platen 1.

The dog 26 is normally in engagement with the ratchet wheel 27 to prevent accidental backward turning of the latter, which would sometimes mislead the operator by dropping the tally strip 11 sufficiently far down in front of the segmental platen 5 to cause the last item to occupy the position from which it had just been advanced by the operation of the dog 26. This would lead the operator to think that he had already entered the total of the last written bill when in fact he had not entered such total. Such confusion and resulting mistakes are obviated by normally locking the ratchet 27 against backward movement.

When it is desired to unwind the written tally strip from the spool 7, it is only necessary to depress the key 15, thereby raising the link 17 until a cam or shoulder 30 on the latter engages the relatively fixed platen axle 2 and by riding up thereon throws the dog 25 forwardly away from the ratchet wheel 27 as at Fig. 1, thereby permitting the ratchet wheel to be turned backwardly to pay off the tally strip. The link 17 has a slot 31 to engage a pin 32 on the key arm 18, to permit the forward movement of the upper end of the link. It will be understood that this dog releasing movement, although occurring at every depression of the key 15 after advancing the ratchet wheel 27, is intended principally to release the ratchet wheel for the purpose of unwinding the ribbon strip. At the return of the key 15 to normal position a hook or cam 33 formed on the upper portion of the link 17 engages the top of the axle 2 to force the dog 26 again into engagement with the ratchet wheel 27.

The leading end of the tally strip 8 is held on to the core 34 of the winding spool 7 by means of a clip in the form of a bail comprising a pair of arms 35 and a cross bar 36 uniting said arms. The latter are curved and normally occupy recesses 37 between the heads of the spool and the body of the core, the latter being reduced at its ends to form said recesses. The bar 36 is adapted to press the paper 8 into a recess 38 extending from end to end of the spool core. The ends of the bail are turned in to form pivots 39 let into the ends of the core, and the bowed arms 35 are sufficiently yielding to enable the bar 36 to be sprung into recess 38 from the Fig. 8 to the Fig. 5 position. To release the clip, access is afforded to the bar 36 by means of a nick 40, Fig. 11, formed in the spool core between its ends. The strip 8 is led down from the spool 9 around the spool 7 and thence downwardly and forwardly around the apron 68 and upwardly around the segmental platen 5 and over a roll 57, and thence backwardly to the winding spool 7.

The delivery spool 9 comprises two flanges and a core 43, the latter fixed to the outer flange 44 and detachably mounted upon a stud 45 projecting from an upstanding arm 46. Outside of the flange, the end of the core is slotted transversely on its opposite sides, the slots forming perforations and receiving a pair of forks 47 adapted to engage an annular groove 48 formed in the end of the stud 45, whereby the core and flange are locked upon the stud. Said forks are formed upon a plate or latch 49 having a finger piece 50, whereby the forks may be withdrawn from the groove in the stud, thus permitting the core and flange to be taken off for withdrawing the paper roll or inserting a fresh roll. The end of the plate is guided by a screw or rivet 51, and the plate is preferably bowed or sprung between the head of the screw and the spool flange, as illustrated, so as to make sufficient friction to hold the plate where it is set. A slot 52 in the plate through which the screw passes, limits the throw of the latch.

The segmental platen 5 has dove-tailed upper and lower edges to fit between converging jaws 53, 54 bent forward from a vertical plate 55, which forms the backing for the platen 5. Ears 56 are bent up from the upper plate 53 to carry an anti-friction roll 57 over which the strip is led. A pair of cheeks 58 are bent back from the plate 55 and perforated at 59 to hinge upon the platen axle 2. The front face of the segment 5 is a trifle eccentric to the surface of the platen 1, as seen at Fig. 17, so that by raising or lowering the segmental platen about the axle 2, it is brought into proper position to be struck by the type 6, the type bars usually striking a fixed anvil 60 to limit the printing strokes thereof. A bail like frame, confined between the cheeks 58, comprises side arms 61 and connecting bars 62, and is mounted upon both the platen axle 2 and the rod 29. A rod or tube 63 extends from one arm 61 to the other, and a screw 64 passes through a curved slot 65 in each of the arms 61 to secure the cheeks 58 or the segmental platen frame in any position to which it may be adjusted about the platen axle 2. The screw is threaded into a boss 67 upon the left-hand arm 58. An apron 68 curves rearwardly and upwardly from the lower jaw 54, to serve as a guide for the descending tally strip.

The arm 46 at its lower end is bent laterally at 69 and upwardly at 70, the parts 46 and 70 being perforated to fit upon a boss 71 which is rigidly secured to the right hand arm 61, and which surrounds the hollow shaft 28. Said boss is formed with a depression 72 in which is pressed a roll 73 by means of a spring 74 carried by the cross arm 69, Figs. 4 and 7. The spring serves to hold the arm 46 in the working position, as seen at Fig. 1, in full lines, that is, with the spool 9 sufficiently forward of the top 75 of the paper shelf to give ample room for the operator's hand to pass back of the spool to insert a sheet around the main platen 1. When the tally strip is no longer in use, the arm 46 may be pressed back to the dotted line position at Fig. 1, where it is out of the way.

The spool 10, which has a detachable core and flange like those of the spool 9, is mounted upon a stud 76 projecting from an arm 77 detachably secured upon the top of the arm 46, the arm 77 having a key-hole slot 78 to engage an upper headed stud 79 upon arm 46, and also having forks 80 at its lower portion to engage a lower headed stud 81 upon arm 46. By drawing up the arm 77 the forks 80 are drawn off from the stud 81 and the enlarged lower portion of the key-hole slot 78 may be slipped off from the head of the stud 79. The carbon strip spool 10 may thus be readily attached to or detached from the arm 46; and it will be understood that the carbon strip 11 is wound upon the spool 7 simultaneously with the tally strip 8. The carbon strip is used when it is desired to make carbon duplicates on the tally strips of the amounts entered upon the bills, which in such a case are inserted far enough to the right to overlap the tally strips.

Variations may be resorted to within the scope of the invention, and portions of the improvements may be used without others.

Having thus described my invention, I claim:

1. The combination with a platen and a pressure roll therefor, of a tally strip winder having a toothed wheel, a dog normally in engagement with said wheel to prevent backward rotation thereof, a key connected to said roll to release the same, and means for enabling said key during its roll-releasing movement to both turn said wheel by means of said dog and carry the dog out of engagement with the wheel.

2. The combination with a platen and a pressure roll, of a ratchet wheel forming part of a tally strip winding device, a key-operated lever, a rock shaft to release said roll, a link connected at one end to said rock shaft and at the other end having a loose connection to said lever, a dog formed on said link and normally engaged to said winding wheel to prevent backward rotation of the latter, and means for tripping the dog away from the wheel at the completion of the down stroke of the key.

3. The combination with a platen and a pressure roll, of a ratchet wheel forming part of a tally strip winding device, a key-operated lever, a rock shaft to release said roll, a link connected at one end to said rock shaft and at the other end having a loose connection to said lever, a dog formed on said link and normally engaged to said winding wheel to prevent backward rotation of the latter, and means for tripping the dog away from the wheel at the completion of the down stroke of the key; a cam being provided to coöperate with the fixed member of the machine to reëngage said dog to said wheel at the return stroke of the key.

4. The combination with a platen and a pressure roll, of a ratchet wheel forming part of a tally strip winding device, a key-operated lever, a rocking member to release said roll, a link connected at one end to said rocking member and at the other end having a pin-and-slot connection to said lever, a dog formed on said link and normally engaged to said winding wheel to prevent backward rotation of the latter, a shoulder on said link to engage a fixed part for tripping the dog away from the wheel at the completion of the down stroke of the key; and a cam upon said link to coöperate with the fixed member of the machine to reëngage said dog to said wheel at the return stroke of the key.

5. In a typewriting machine, the combination with a main platen having an axle and a carriage in which the axle is journaled, of a segmental platen, a frame comprising a plate having upper and lower jaws to hold the top and bottom edges of said segmental platen, cheeks bent back from said plate and having perforations to fit loosely upon the platen axle, said segmental platen being approximately flush with the main platen but slightly eccentric thereto, means to secure the frame where adjusted about the platen axle, and an apron curving backwardly from the lower jaw.

6. In a typewriting machine, the combination with a main platen having an axle and a carriage in which the axle is journaled, of a segmental platen, a frame comprising a plate having upper and lower jaws to hold the top and bottom edges of said segmental platen, cheeks bent back from said plate and having perforations to fit loosely upon the platen axle, said segmental platen being approximately flush with the main platen but slightly eccentric thereto, means to secure the frame where adjusted about the platen axle, and an apron curving backwardly from the lower jaw, ears extending up from the upper jaw and carrying a roller, and spools from one to the other of which a tally strip is led around said apron, segmental platen and roller.

7. In a typewriting machine, the combination with a cylindrical platen and an axle whereby it is journaled upon a carriage, of a segmental platen and a frame therefor, said frame comprising a sheet metal back and converging jaws bent up therefrom, the segmental platen having a dovetailed conformation to fit in said jaws, and cheeks whereby the frame is hinged upon the platen axle.

8. The combination with a revoluble platen and a platen frame or carriage, of a rod mounted in said carriage to extend along the platen, of a tally strip mechanism including a winding spool turning upon said rod, an arm hinged upon said rod and extending upwardly therefrom, a delivery spool carried upon the upper end of said arm and hanging over the platen, and a yielding detent engaging said arm and permitting the latter to be swung backwardly to a position of disuse.

9. The combination with a revoluble platen and a platen frame or carriage, of a rod mounted in said carriage to extend along the platen, of a tally strip mechanism including a winding spool turning upon said rod, an arm hinged upon said rod and extending upwardly therefrom, a delivery spool carried upon the upper end of said arm and hanging over the platen, and a yielding detent engaging said arm and permitting the latter to be swung backwardly to a position of disuse; a second arm detachably mounted upon the top of the first arm, and a carbon-strip spool carried upon the upper end of the second arm.

10. The combination with a revoluble platen and a platen frame, of a tally strip mechanism including a winding spool, an arm extending upwardly, a delivery spool carried upon the upper end of said arm, and hanging over the platen, a second arm detachably mounted upon the first arm, and a carbon strip spool carried upon the upper end of the second arm; the first arm having headed studs, and the second arm having both a key-hole slot to engage the upper stud and a fork to engage the lower stud.

11. In a mechanism of the class described, the combination with a stud transversely grooved at one end, of a spool core having a flange and mounted upon said stud, and a latch in the form of a plate mounted upon the spool flange and having forks fastened through slots or perforations formed on the opposite sides of a projecting end of the core to engage the grooved stud to hold the core detachably upon the stud; said plate having a slot engaging a headed pin or screw to hold the plate upon the flange and limit the throw of the plate; the plate being bowed to produce friction between the same and the spool flange.

HARRY S. McCORMACK.

Witnesses:
JOHN O. SEIFERT,
KITTIE FRANKFORT.